Patented June 15, 1948

2,443,418

UNITED STATES PATENT OFFICE 2,443,418

PRODUCTION OF ISOPARAFFINS

Eric William Musther Fawcett and Eric Sylvester Narracott, Sunbury-on-Thames, England, assignors to Anglo-Iranian Oil Company Limited, London, England, a British corporation No Drawing. Application October 8, 1946, Serial No. 702,060. In Great Britain March 20, 1940

2 Claims. (Cl. 260—683.5)

This application is a continuation-in-part of our co-pending application Serial No. 417,100 filed Oct. 30, 1941, now abandoned, and this invention relates to processes in which normal hydrocarbons such as n-butane and n-pentane, or materials containing substantial proportions of such hydrocarbons, are to a substantial extent converted into branched chain hydrocarbons such as isobutane and isopentane and to contact catalysts for use in the carrying out of such processes.

In such processes it is customary to employ as contact catalyst certain anhydrous metallic halides of which aluminium chloride is typical, and although not essential it is usual in order to obtain maximum activity to employ an activating agent such as a hydrogen halide or water in addition to the metallic halide.

It is well known that one of the major difficulties involved in the operation of a full scale butane isomerisation unit using aluminium chloride catalyst has been the blockage of the fractionating tower, piping, condenser, and heat exchangers, with deposits of aluminium chloride, which sublimes from the reactors due to its high vapour under reaction conditions. These difficulties are frequently not of a serious nature in laboratory equipment, but become extremely serious in full scale plants where long continuous runs are essential. Moreover, in the use of hydrogen halide as an activating agent, the hydrogen halide is usually either continuously supplied and represents a not inconsiderable item of expense from an external source, or is generated in the reaction vessel, that is, in situ, by hydrolysis of the anhydrous aluminium halide. This hydrolysis in situ not only results in uneconomic consumption of catalyst, but also results in the simultaneous presence of water and hydrogen chloride in the reaction vessel. This mixture gives rise to serious corrosion troubles in reaction vessels, fractionating tower, pumps, etc. It is immaterial in this respect whether the water for hydrolysis be supplied as such from an external source or result from the interaction in the reaction vessel of the anhydrous aluminium halide and a hydrous metal salt such as hydrous aluminium chloride.

It is among the objects of this invention to overcome the foregoing difficulties through the provision of a new, useful and improved catalytic process for producing branched chain hydrocarbons from normal paraffins and through the provision of a new, useful and improved contact catalyst having a relatively low "volatility" throughout the operating temperature range and a high catalytic activity even in the absence of a promotor or activating agent.

According to the invention, a normal paraffin feedstock is contacted, preferably in the presence of a small proportion of a catalytic promoter such as water or an hydrogen halide, at a temperature in the range 50° to 150° C., with a catalyst previously prepared by the fusion together of a mixture of anhydrous aluminium halide and an hydrated aluminium halide in which the ratio of the anhydrous aluminium halide to the hydrated aluminium halide is greater than 1:1 but not greater than 5:1.

According to the process of the invention there is a considerable saving in the amount of catalytic promoter required, the tendency of the aluminium halide to be removed from the reaction vessel by solution in the reactants or by evaporation is much reduced, and depositing of aluminium halide in objectionable amounts in the processing equipment, and corrosion of such equipment, is substantially avoided.

In the preparation of the fused catalyst, the proportions of anhydrous and hydrous aluminium halide are chosen so as to ensure that the hydrated aluminium halide is present in quantity less than is required completely to hydrolise the anhydrous aluminium halide to the hydrolysis product Al(OH)$_3$ in accordance with the reaction:

$$AlCl_3 + AlCl_3.6H_2O \ldots 2Al(OH)_3 + 6HCl$$

but not less than is required completely to hydrolise the anhydrous aluminium halide to the first hydrolysis product AlCl$_2$OH in accordance with the reaction:

$$5AlCl_3 + AlCl_3.6H_2O \ldots 6AlCl_2OH$$

whereby there may be obtained a fused material which does not contain free anhydrous aluminium halide, is of great catalytic power for the conversion of normal to branched chain hydrocarbons and is of low vapour pressure.

A typical catalyst in accordance with the invention may be prepared by fusing together 5 molecular proportions of anhydrous aluminium chloride and 1 molecular proportion of hydrated aluminium chloride AlCl$_3$.6H$_2$O in a catalyst preparation stage prior to contacting these materials with the hydrocarbon feedstock to be converted. Neither the temperature nor time of heating is critical in the fusing operation, provided only that the reaction is allowed to take place. A temperature of 100° C. for a long period in the order of 12 to 16 hours has been found to be eminently satisfactory for the carrying out of the reaction which is indicated by the evolution of hydrogen chloride and is preferably carried out in a simple closed vessel lined with ceramic materials to avoid corrosion difficulties. Such catalysts may be prepared in the form of pellets by compression of the powdered catalyst or they may be mixed or incorporated with porous carrier substances such as active carbon or silica gel.

Processes in which catalysts according to the present invention are used may be carried out in liquid or vapour phase and the mode of operation may be either a batch or continuous process.

In a preferred mode of operation a continuous stream of hydrocarbon raw material is passed through a reaction vessel containing the catalyst in the form for example of pellets or in granular condition, the reaction vessel being maintained at the determined temperature and pressure. The product leaving the reaction vessel and containing substantial proportions of branched chain hydrocarbons may if desired be fractionated to separate the normal and branched chain hydrocarbons, the normal hydrocarbons being re-cycled through the reaction vessel.

The reaction will normally be carried out at elevated temperature not exceeding 350° C. and normally in the temperature range 50-200° C. Superatmospheric pressures may also be employed and the present catalysts in small proportions may be used in conjunction with known catalysts activators such as a hydrogen halide especially hydrogen chloride or water.

*Example 1.*—A catalyst was prepared by fusing together at a temperature of about 100° C. for a long period in the order of 14 hours 191 grams of anhydrous aluminium chloride and 73.8 grams of hydrated aluminium chloride ($AlCl_3.6H_2O$). The fused mixture was ground to a fine powder and formed by compression into pellets ½" diameter and ¼" long.

A stream of pure normal butane was passed through a reaction vessel of 55 ccs. capacity at a rate of 300 ccs. per hour, containing catalysts of the composition described; the reaction vessel was maintained at 124° C. and the pressure was atmospheric. No hydrogen chloride was added to the stream of n-butane. Samples of the vapours issuing from the reaction vessel were taken periodically, and analysed to determine their content of isobutane. The analyses of the samples are listed in the following table:

| Time from start, Hours | Conversion, per cent isobutane in product |
|---|---|
| 0-17 | 34.0 |
| 24-41 | 23.3 |
| 78-95 | 24.3 |
| 111-150 | 23.3 |
| 136-156 | 25.9 |
| 159-177 | 24.5 |
| 162-200 | 23.3 |

*Example 2.*—N-butane was passed at the same rate as in Example 1, through the same reaction vessel maintained at the same temperature and pressure, and containing the same catalyst, but an equal volume of hydrogen chloride was mixed with the n-butane stream. The vapour stream leaving the reaction vessel contained 48.3% of isobutane.

*Example 3.*—N-butane was passed at the same rate as in Examples 1 and 2 through the same reaction vessel maintained at the same temperature and pressure as before, and containing a fresh sample of the catalyst prepared as in Example 1. 1% by volume of hydrogen chloride, based on the n-butane feed was mixed with the n-butane stream. Samples of the vapours stream issuing from the reaction vessel were taken as before, and their analysis is listed in the following table:

| Time from start, Hours | Conversion, per cent isobutane in product |
|---|---|
| 0-17 | 34.0 |
| 17-29 | 28.1 |
| 29-47 | 28.8 |
| 51-69 | 27.6 |
| 85-102 | 28.3 |
| 140-156 | 28.3 |
| 170-193 | 31.7 |

This table shows that a 1% addition of hydrogen chloride made no appreciable output increase for the first 17 hours, but afterwards gave an average increase of about 3-4%.

*Example 4.*—N-butane was passed at the same rate as in the Examples 1-3, through the same reaction vessel containing a further sample of the catalyst prepared as in Example 1, and maintained at atmospheric pressure. No hydrogen chloride was added to the n-butane stream. Samples of the vapour stream leaving the reaction vessel were taken, while the reaction vessel was maintained at temperatures of 110, 124, 132 and 140° C. in succession. The samples had the following analysis:

| Temperature °C. | Conversion, per cent isobutane in product |
|---|---|
| 110 | 9.6 |
| 124 | 24.3 |
| 132 | 28.7 |
| 140 | 51.9 |

*Example 5.*—A catalyst was prepared by fusing together 5 molecular proportions of $Al_2Cl_6$ and 1 molecular proportion of $AlCl_3.6H_2O$ and determinations made of the vapour pressure of this fused catalyst and of anhydrous aluminium chloride alone. The results show that at 150° C. the vapour pressure of the fused catalyst is about ⅛ only of the vapour pressure of the anhydrous aluminium chloride alone.

*Vapour pressure determinations*

Since the vapour pressure of aluminium chloride at 97° C. is reported to be only 0.102 mm. Hg (International Critical Tables) a dynamic method was chosen in preference to a static method for the vapour pressure determinations. An all-glass apparatus was used consisting of a U-tube, pre-heater, and a condenser, the first two being mounted in a thermo-regulated air oven. The condenser was followed by a check absorption tube in the usual way. Air flow was measured by water displacement and the inlet air was dried by sulphuric acid. The catalyst sample was protected from backward diffusion of water vapour by a drying tube. The vapour pressure was calculated from the relationship $$\frac{\text{Total pressure}}{\text{Vapour pressure of the sample}} = \frac{\text{Total volume of gas}}{\text{Volume aluminium chloride vapour}}$$

assuming a molecular weight of 267 for both $Al_2Cl_6$ and catalyst.

Results

The performance of the apparatus was checked by determinations on anhydrous aluminium chloride and a comparison of the results with literature figures. In view of the fact that the vapour pressure of the catalyst was of the order ⅛ of that of aluminium chloride at 150° C. and the vapour pressure of aluminium chloride at 100° C. is very small, no catalyst determination at 100° C. was attempted. The results are summarised in the following table:

| Sample | Temp., °C. | Vapour Pressure, mm. Hg | |
|---|---|---|---|
| | | Observed | Lit. Figure |
| Anhydrous aluminium chloride | 97 | 0.325 | 0.102 |
| | 98 | | 1.1 |
| | 147 | 65.4 | 68.5 |
| | 148 | 66.0 | 74.0 |
| | 150 | | 88.0 |
| Catalyst Sample (5/1 $Al_2Cl_6$ to $AlCl_3.6H_2O$) | 148 | 8.1 | |
| | 149 | 9.8 | |

NOTE.—The vapour pressure of anhydrous aluminium chloride is rising very rapidly with temperature at 150° C., and as the oven temperature control was estimated to be not better than ±1° C., the discrepancies in the above table may be neglected for present purposes.

What is claimed is:

1. A process for producing branched chain hydrocarbons from normal paraffins, in which a normal paraffin feedstock is contacted at a temperature in the range 50–150° C. with a catalyst previously prepared in a catalyst preparation stage prior to contacting the catalyst with the feedstock, by fusion together of a mixture of anhydrous aluminium halide and an hydrated aluminium halide in which the ratio of the anhydrous aluminium to the hydrated aluminium halide is greater than 1:1, but not greater than 5:1.

2. A catalyst for the production of branched chain hydrocarbons from normal hydrocarbons prepared by the fusion together of a mixture of an anhydrous aluminium halide and an hydrated aluminium halide in which the ratio of the anhydrous aluminium halide to the hydrated aluminium halide is greater than 1:1 but not greater than 5:1.

ERIC WILLIAM MUSTHER FAWCETT.
ERIC SYLVESTER NARRACOTT.

REFERENCES CITED

The following references are of record in the file of this patent:

UNITED STATES PATENTS

| Number | Name | Date |
|---|---|---|
| 2,347,266 | Ipatieff et al. | Apr. 25, 1944 |

OTHER REFERENCES

Glasebrook et al., J. A. C. S., 58, 1944–48 (1936).